US012683853B2

(12) United States Patent
Khanna et al.

(10) Patent No.: US 12,683,853 B2
(45) Date of Patent: Jul. 14, 2026

(54) COMPREHENSIVE AND INTELLIGENT COMMUNICATION TRACKING SYSTEM

(71) Applicant: BANK OF AMERICA CORPORATION, Charlotte, NC (US)

(72) Inventors: Saurabh Khanna, Frisco, TX (US); Muralidhar Chowdarapu, Simi Valley, CA (US); Pawan K. Shetty, McKinney, TX (US); Mansoor Zafar, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 233 days.

(21) Appl. No.: 18/731,815

(22) Filed: Jun. 3, 2024

(65) Prior Publication Data

US 2025/0373485 A1     Dec. 4, 2025

(51) Int. Cl.
H04L 41/0654          (2022.01)
H04L 43/0852          (2022.01)

(52) U.S. Cl.
CPC ...... H04L 41/0654 (2013.01); H04L 43/0852 (2013.01)

(58) Field of Classification Search
CPC ..................... H04L 41/0654; H04L 43/0852
See application file for complete search history.

(56) References Cited

U.S. PATENT DOCUMENTS

| | | | |
|---|---|---|---|
| 7,801,131 | B2 | 9/2010 | Horst |
| 8,214,847 | B2 | 7/2012 | Chkodrov |
| 8,428,231 | B2 | 4/2013 | Vandenbulcke |
| 8,549,090 | B2 | 10/2013 | Gotlieb |
| 9,819,621 | B2 | 11/2017 | Ghafourifar |
| 2008/0162645 | A1 | 7/2008 | Kraft |
| 2011/0213842 | A1 | 9/2011 | Takenouchi |
| 2012/0272252 | A1 | 10/2012 | Beardsmore |
| 2014/0059151 | A1 | 2/2014 | Kraft |
| 2015/0045004 | A1 | 2/2015 | Varadharajan |
| 2015/0156150 | A1 | 6/2015 | Bartkiewicz |
| 2016/0285986 | A1 | 9/2016 | Mokhtari |
| 2017/0201965 | A1 | 7/2017 | Basavaraj |

(Continued)

*Primary Examiner* — Schquita D Goodwin
(74) *Attorney, Agent, or Firm* — Moore & Van Allen PLLC; Nicholas C. Russell

(57) ABSTRACT

A comprehensive and centralized system for managing and tracking communications being delivered through both digital communications channels and physical communication channels. A centralized computing hub receives communication requests from originating systems of record or via user input. In response to receiving a communication request, content is generated or otherwise obtained and quality assurance checks are performed to assure that the content meets the requirements of the originating system of record and is applicable to the intended communication recipient. Once the quality checks have been performed and the content is deemed verified, delivery of the communications is orchestrated in accordance with the chosen communication channel. The timeliness of the communications is tracked throughout the system and alerts are generated in response to the timeliness exceeding thresholds. Thresholds are intelligently determined on a continuous basis using rolling averages of previous communications that result in predictions of future communication averages.

20 Claims, 6 Drawing Sheets

(56)  References Cited

U.S. PATENT DOCUMENTS

| | | | | |
|---|---|---|---|---|
| 2017/0317944 | A1* | 11/2017 | John | .................... H04L 43/0864 |
| 2020/0120008 | A1* | 4/2020 | Deb | ..................... H04L 43/062 |
| 2021/0258803 | A1 | 8/2021 | Sugata | |
| 2021/0342337 | A1* | 11/2021 | Lu | .......................... G06F 11/324 |
| 2021/0374801 | A1 | 12/2021 | Longo | |
| 2021/0374802 | A1 | 12/2021 | Longo | |
| 2024/0106774 | A1 | 3/2024 | Reil | |
| 2025/0023827 | A1 | 1/2025 | Nakata | |

* cited by examiner

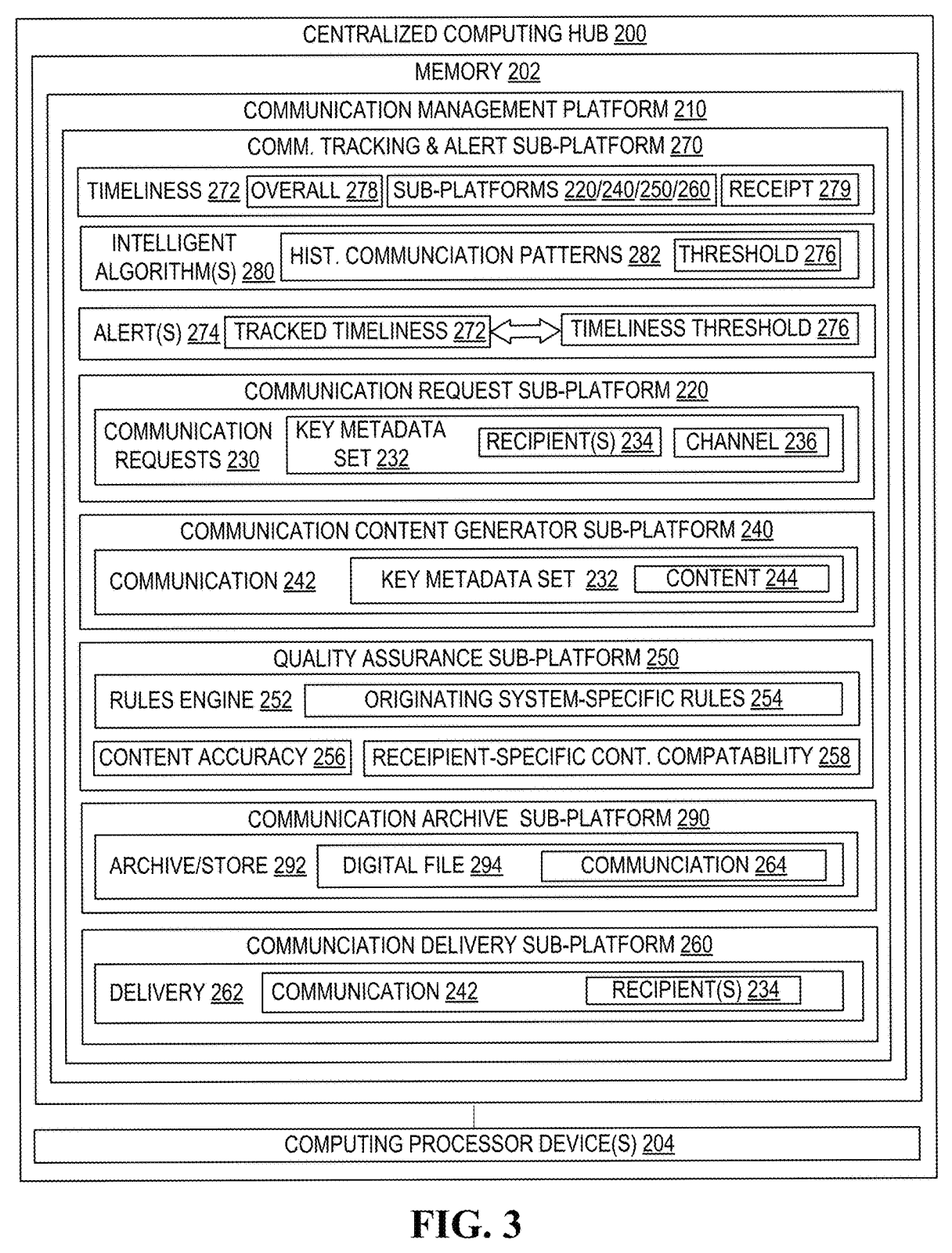

CENTRALIZED COMPUTING HUB 200

MEMORY 202

COMMUNICATION MANAGEMENT PLATFORM 210

COMM. TRACKING & ALERT SUB-PLATFORM 270

| TIMELINESS 272 | OVERALL 278 | SUB-PLATFORMS 220/240/250/260 | RECEIPT 279 |

INTELLIGENT ALGORITHM(S) 280 | HIST. COMMUNCIATION PATTERNS 282 | THRESHOLD 276

ALERT(S) 274 | TRACKED TIMELINESS 272 <——> TIMELINESS THRESHOLD 276

COMMUNICATION REQUEST SUB-PLATFORM 220

COMMUNICATION REQUESTS 230 | KEY METADATA SET 232 | RECIPIENT(S) 234 | CHANNEL 236

COMMUNICATION CONTENT GENERATOR SUB-PLATFORM 240

COMMUNICATION 242 | KEY METADATA SET 232 | CONTENT 244

QUALITY ASSURANCE SUB-PLATFORM 250

RULES ENGINE 252 | ORIGINATING SYSTEM-SPECIFIC RULES 254

CONTENT ACCURACY 256 | RECEIPIENT-SPECIFIC CONT. COMPATABILITY 258

COMMUNICATION ARCHIVE SUB-PLATFORM 290

ARCHIVE/STORE 292 | DIGITAL FILE 294 | COMMUNCIATION 264

COMMUNCIATION DELIVERY SUB-PLATFORM 260

DELIVERY 262 | COMMUNICATION 242 | RECIPIENT(S) 234

COMPUTING PROCESSOR DEVICE(S) 204

FIG. 3

600

610 — RECEIVE COMMUNICATION REQUESTS FROM A PLURALITY OF ORIGINATION SYSTEMS, EACH COMMUNICATION REQUEST INCLUDES A KEY METADATA SET DEFINING CRITERIA FOR COMMUNICATING COMMUNICATION(S), THE CRITERIA INCLUDES IDENTIFICATION OF (*I*) COMMUNICATION RECIPIENTS AND (*II*) A DESIGNATED COMMUNICATION CHANNEL

620 — GENERATE CONTENT FOR THE COMMUNICATION(S) IN A CORRESPONDING COMMUNICATION REQUEST BASED ON THE KEY METADATA SET

630 — IMPLEMENT ORIGINATION SYSTEM-SPECIFIC RULES TO VERIFY (*I*) ACCURACY AND (*II*) COMMUNICATION RECIPIENT-COMPATIBILITY OF THE CONTENT

640 — ORCHESTRATE DELIVERY OF THE COMMUNICATION(S) TO THE COMMUNICATION RECIPIENT(S) ACROSS THE DESIGNATED COMMUNICATION CHANNEL

650 — TRACK TIMELINESS OF PROCESSING THE COMMUNICATION(S) FROM (*A*) RECEIVING THE COMMUNICATION REQUEST TO (*B*) ORCHESTRATING DELIVERY OF THE ONE OR MORE COMMUNICATION(S) AND TRIGGER GENERATION AND COMMUNICATION OF ONE OR MORE ALERTS TO DESIGNATED ENTITIES IN RESPONSE TO THE TRACKED TIMELINESS FAILING TO MEET ONE OR MORE DEFINED TIMELINESS THRESHOLDS

FIG. 6

COMPREHENSIVE AND INTELLIGENT COMMUNICATION TRACKING SYSTEM

FIELD OF THE INVENTION

The present invention is generally directed to data communication and, more specifically, a system that incorporates an intelligent centralized hub for comprehensive generation, tracking/monitoring and orchestration of the delivery of communications irrespective of communication channel.

BACKGROUND

Certain large entities, such as financial institutions or the like, produce and distribute an enormous volume of communications to their respective users and/or potential users. Such communications are delivered through multiple disparate communications channels such as digital communication channels, including electronic mail (i.e., email), Short Message Service (SMS) messages (i.e., texts), online post/ messages, facsimiles (i.e., fax), electronic forms (i.e., c-forms) and the like, as well as, physical channels, such as conventional mail or the like. Moreover, in large entities the communications are requested by different entities and/or different originating systems. As a result, the processing (i.e., generation and delivery) of such communications tends to occur in isolation based on which entity or originating system is requesting or otherwise triggering the communication and, in some instance, which communication channel is being implemented.

Further, in certain large entities, such as financial institutions or the like, regulatory and/or compliance rules may exist for certain types of communications, which mandate that such communications be communicated to users within prescribed timeframes. In such instances, it is essential for the entity to be capable of ensuring the guaranteed delivery of communications and the communication itself contains the requisite content.

Therefore, a need exists to develop systems, computerized methods and the like that provide for centralized processing (i.e., generation and delivery) of outbound communications across an entirety of entity/organization and disparate communication channels. The desired system, computerized method and the like should provide for tracking the timeliness/progress of the overall communication delivery process (i.e., from communication request to communication delivery/receipt) and each sub-process along the way (e.g., content generation, archive/storage, delivery and the like). Moreover, desired systems, computerized methods and the like, should provide for provide for adequate quality checks along the way to insure the completeness and accuracy of all outbound communications.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing a comprehensive (i.e., enterprise/entity-wide) and centralized system for managing and tracking communications being delivered through both digital communications channels and physical communication channels.

As a result of the invention, completeness, accuracy and timeliness of all communications is assured. In regard to completeness, the present invention provides assurance that all communications are complete in terms of content and have undergone requisite workflow processing, which can be demonstrated through documentation. In regard to accuracy, the present invention enforces quality assurance checks throughout the process to assure that the content is accurate and appropriate for the intended recipient. In regards to timeliness, the present invention tracks overall workflow timing as well as individual tracking of various stages of the workflow to assure that the required timing for delivery is met or, in the event that tracking of timing indicates a delay, provides mechanisms for addressing the delay to assure that the required timing for delivery is met and/or taking actions to assure future deliveries do not incur such delay(s).

Specifically, the centralized computing hub receives communication requests from originating systems of record or via user input. The requests include key metadata sets required for generating and delivering communications including communication channel (e.g., email, SMS/text, online post, snail mail, or the like), delivery recipient(s) and the like. In response to receiving a communication request, content is generated or otherwise obtained and quality assurance checks are performed to assure that the content meets the requirements of the originating system of record and is applicable to the intended communication recipient. Once the quality checks have been performed and the content is deemed verified, delivery of the communications is orchestrated in accordance with the chosen communication channel.

In addition, as the communication management workflow progresses the communications are tracked to assure the timeliness of the communications. In this regard, the present invention provides for tracking the timeliness of the overall workflow (i.e., from communication request receipt to communication delivery, as well as tracking the timeliness of individual segments/processes within the overall workflow, such as, content generation, quality assurance, communication delivery, communication receipt and the like. The tracked times are compared to timeliness thresholds to assure that the communications are or will be delivered on time. In the event that that the tracked time exceeds a timeliness threshold, an alert is automatically generated and communicated to a party of interest that is equipped to address the delay.

In specific embodiments of the invention the timeliness thresholds are dynamically determined on a continuous basis using intelligent algorithms that rely on a rolling average as to the quantity of specific communications processed during a specified period of time (e.g., daily, weekly, monthly or the like) as well the average time required to process the rolling average of communications. In this regard, the invention provides for intelligently and constantly recalibrating/updating the timeliness thresholds based on constant changes in the rolling average of communications.

A system for centralized and intelligent communication management defines first embodiments of the invention. The system includes a centralized computing hub, which may comprise one or more computing devices, such as servers, storage devices or the like. The centralized computing hub includes a memory and one or more computing processor devices in communication with the memory.

The memory stores a communication management platform that is executable by at least one of the one or more computing processor devices and is capable of managing communications delivered across both digital communications channels (e.g., electronic mail (i.e., email), Short Message Service (SMS) messages (i.e., texts), online post/messages, facsimiles (i.e., fax), electronic forms (i.e., e-forms) and the like) and physical communication channels (e.g., conventional mail or the like.

The communication management platform includes a communication request sub-platform that is configured to receive communication requests from the plurality of origination systems (e.g., Systems of Record (SORs) or the like) or requestors. Each communication request includes at least one key metadata set that defines the criteria for communicating one or more communications (i.e., a single one-off communication or multiple communications, typically referred to as a "batch"). The criteria includes, but is not limited to, (i) one or more communication recipients for receiving a corresponding communication from amongst the one or more communications and (ii) a designated communication channel for delivering the one or more communication.

The communication management platform additionally includes a communication generator sub-platform configured to generate content for the one or more communications in a corresponding communication request based on the key metadata set. In specific embodiments of the system, the communication generator sub-platform is further configured to generate a batch identifier for the one or more communications in a corresponding request.

Additionally, the communication management platform includes a communication a quality assurance sub-platform including a rules engine. The quality assurance sub-platform is configured to implement origination system-specific rules from the rules engine to verify (i) accuracy and (ii) communication recipient-compatibility of the content. In addition, the communication management platform includes a communication delivery sub-platform configured to orchestrate delivery of the one or more communications to the one or more communication recipients across the designated communication channel.

Moreover, the communication management platform includes a communication tracking and alert sub-platform configured to track timeliness of the processing the one or more communications within the communication management platform and trigger generation and communication of one or more alerts to one or more designated entities in response to the tracked timeliness failing to meet one or more defined timeliness thresholds. In specific embodiments of the system, the communication tracking and alert sub-platform is configured to track an overall timeliness of an entirety of processing the one or more communications within the communication management platform and trigger generation and communication of alerts to designated entities in response to the tracked overall timeliness failing to meet a defined overall timeliness threshold. In other embodiments the system, the communication tracking and alert sub-platform is configured to track timeliness within one or more sub-platforms of the communication management platform (i.e., at the various communication management stages) and trigger generation and communication of alerts to designated entities in response to the tracked timeliness within one of the one or more sub-platforms failing to meet one or more defined sub-platform-specific timeliness thresholds. In further embodiments of the system, the communication tracking and alert sub-platform is further configured to track timeliness of receipt of the one or more communications by the corresponding one or more communication recipients and trigger generation and communication of one or more alerts to one or more designated entities in response to the tracked timeliness of receipt of the one or more communications by the corresponding one or more communication recipients failing to meet one or more defined receipt-related timeliness thresholds.

In further specific embodiments of the system, the communication tracking and alert sub-platform includes at least one intelligent algorithm that is configured to intelligently and dynamically determine, on a continuous basis, the one or more timeliness thresholds based at least on historical communication patterns that define an average volume of communications requested from (i) an originating system from amongst the plurality of originating systems or (ii) an entity in control of the originating system over a predefined rolling historical time period. In specific related embodiments of the system, the timeliness thresholds that are dynamically determined by the intelligent algorithms are based on a predicted average volume of communications requested from (i) the originating system from amongst the plurality of originating systems or (ii) the entity in control of the originating system over a predefined future time period.

In specific embodiments of the system, in which the communication request sub-platform is configured to generate a batch identifier, the communication tracking and alert sub-platform is further configured to capture data within one or more of the sub-platforms based on the batch identifier and track the timeliness of processing the one or more communications within the communication management platform based on the captured data.

In still further specific embodiments of the system, the quality assurance sub-platform includes at least one intelligent algorithm configured to intelligently identify quality deficiencies in the processing the one or more communications within the communication management platform and, in response to identifying a quality deficiency, implement one or more corrective actions to remedy the quality deficiency. For example, in specific embodiments of the system, the quality deficiency that is identified is an error in delivering a communication to a communication recipient and in response to identifying the error, the quality assurance sub-platform implement the one or more corrective actions including at least one of (i) calling back the delivery of the communication to the communication recipient and (ii) notifying an in control of the originating system of the error in delivery.

A computer-implemented method for centralized and intelligent communication management defines second embodiments of the invention. The method is executable by one or more computing processor devices. The method includes receiving communication requests from a plurality of origination systems. Each communication request includes a key metadata set defining criteria for communicating one or more communications. The criteria includes, but is not limited to, (i) one or more communication recipients for receiving a corresponding communication from amongst the one or more communications and (ii) a designated communication channel for delivering the one or more communications. In addition, the computer-implemented method includes generating content for the one or more communications in a corresponding communication request based on the key metadata set and implementing origination system-specific rules to verify (i) accuracy and (ii) communication recipient-compatibility of the content. Further, the computer-implemented method includes orchestrating delivery of the one or more communications to the one or more communication recipients across the designated communication channel. Moreover, the computer-implemented method includes tracking timeliness of processing the one or more communications from (a) receiving the communications to (b) orchestrating delivery of the one or more communications and triggering generation and communication of one or more alerts to one or more designated entities in response to the tracked timeliness failing to meet one or more defined timeliness thresholds.

In specific embodiments of the computer-implemented method, tracking timeliness and triggering the generation and communication of one or more alerts further comprises at least one of (1) tracking an overall timeliness of an entirety of processing the one or more communications from receiving the communications to orchestrating delivery of the one or more communications and triggering the generation and communication of alerts to designated entities in response to the tracked overall timeliness failing to meet a defined overall timeliness threshold, (2) tracking timeliness within one or more of the steps of (i) generating content, (ii) orchestrating delivery and triggering generation and communication of alerts to designated entities in response to the tracked timeliness within one or more of the steps of (i) generating content, (ii) orchestrating delivery failing to meet one or more defined step-specific timeliness thresholds, and (3) tracking timeliness of receipt of the one or more communications by the corresponding one or more communication recipients and triggering generation and communication of one or more alerts to one or more designated entities in response to the tracked timeliness of receipt of the one or more communications by the corresponding one or more communication recipients failing to meet one or more defined receipt-related timeliness thresholds.

In further specific embodiments the computer-implemented method includes dynamically determining, on a continuous basis, the one or more timeliness thresholds based at least on historical communication patterns that define an average volume of communications requested from (i) an originating system from amongst the plurality of originating systems or (ii) an entity in control of the originating system over a predefined rolling historical time period.

Moreover, in further specific embodiments the computer-implemented method includes identifying quality deficiencies in one or more of the steps of (i) generating content, and (ii) orchestrating delivery and, in response to identifying a quality deficiency, implementing one or more corrective actions to remedy the quality deficiency.

A computer program product including a non-transitory computer-readable medium defines third embodiments of the invention. The non-transitory computer-readable medium includes a set of codes for causing one or more computing devices to receive communication requests from a plurality of origination systems. Each communication request includes a key metadata set defining criteria for communicating one or more communications. The criteria includes, but is not limited to, (i) one or more communication recipients for receiving a corresponding communication from amongst the one or more communications and (ii) a designated communication channel for delivering the one or more communications. The computer-readable medium further includes sets of codes for causing one or more computing devices to generate content for the one or more communications in a corresponding communication request based on the key metadata set and implement origination system-specific rules to verify (i) accuracy and (ii) communication recipient-compatibility of the content. Further, the computer-readable medium further includes a set of codes for causing one or more computing devices to orchestrate delivery of the one or more communications to the one or more communication recipients across the designated communication channel. Moreover, the computer-readable medium further includes a set of codes for causing one or more computing devices to track timeliness of processing the one or more communications from receiving the communications to orchestrating delivery of the one or more communications and trigger generation and communication of one or more alerts to one or more designated entities in response to the tracked timeliness failing to meet one or more defined timeliness thresholds.

In specific embodiments of the computer program product, the set of codes for causing the one or more computer devices to track timeliness and trigger the generation and communication of one or more alerts are further configured to cause the one or more computing devices to perform at least one of (1) track an overall timeliness of an entirety of processing the one or more communications from receiving the communications to orchestrating delivery of the one or more communications and trigger the generation and communication of alerts to designated entities in response to the tracked overall timeliness failing to meet a defined overall timeliness threshold, (2) track timeliness of at least one of (i) generating content, and (ii) orchestrating delivery and triggering generation and communication of alerts to designated entities in response to the tracked timeliness within at least one of (i) generating content, (ii) orchestrating delivery failing to meet one or more defined step-specific timeliness thresholds, and (3) track timeliness of receipt of the one or more communications by the corresponding one or more communication recipients and triggering generation and communication of one or more alerts to one or more designated entities in response to the tracked timeliness of receipt of the one or more communications by the corresponding one or more communication recipients failing to meet one or more defined receipt-related timeliness thresholds In further specific embodiments of the computer program product, the sets of codes further comprise a set of codes for causing the one or more computer devices to dynamically determine, on a continuous basis, the one or more timeliness thresholds based at least on historical communication patterns that define an average volume of communications requested from (i) an originating system from amongst the plurality of originating systems or (ii) an entity in control of the originating system over a predefined rolling historical time period.

Moreover, in further specific embodiments of the computer program product, the sets of codes further comprise a set of codes for causing the one or more computer devices to identify quality deficiencies in one or more of the steps of (i) generating content, (ii) orchestrating delivery and, in response to identifying a quality deficiency, implementing one or more corrective actions to remedy the quality deficiency.

Thus, according to embodiments of the invention, which will be discussed in greater detail below, the present invention addresses needs and/or achieves other advantages by providing for a comprehensive and centralized system for managing and tracking communications being delivered through both digital communications channels and physical communication channels. The timeliness of the communications is tracked throughout the system and alerts are generated in response to the timeliness exceeding thresholds. Thresholds are intelligently determined on a continuous basis using rolling averages of previous communications and may be based on intelligent predictions of future communication averages.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
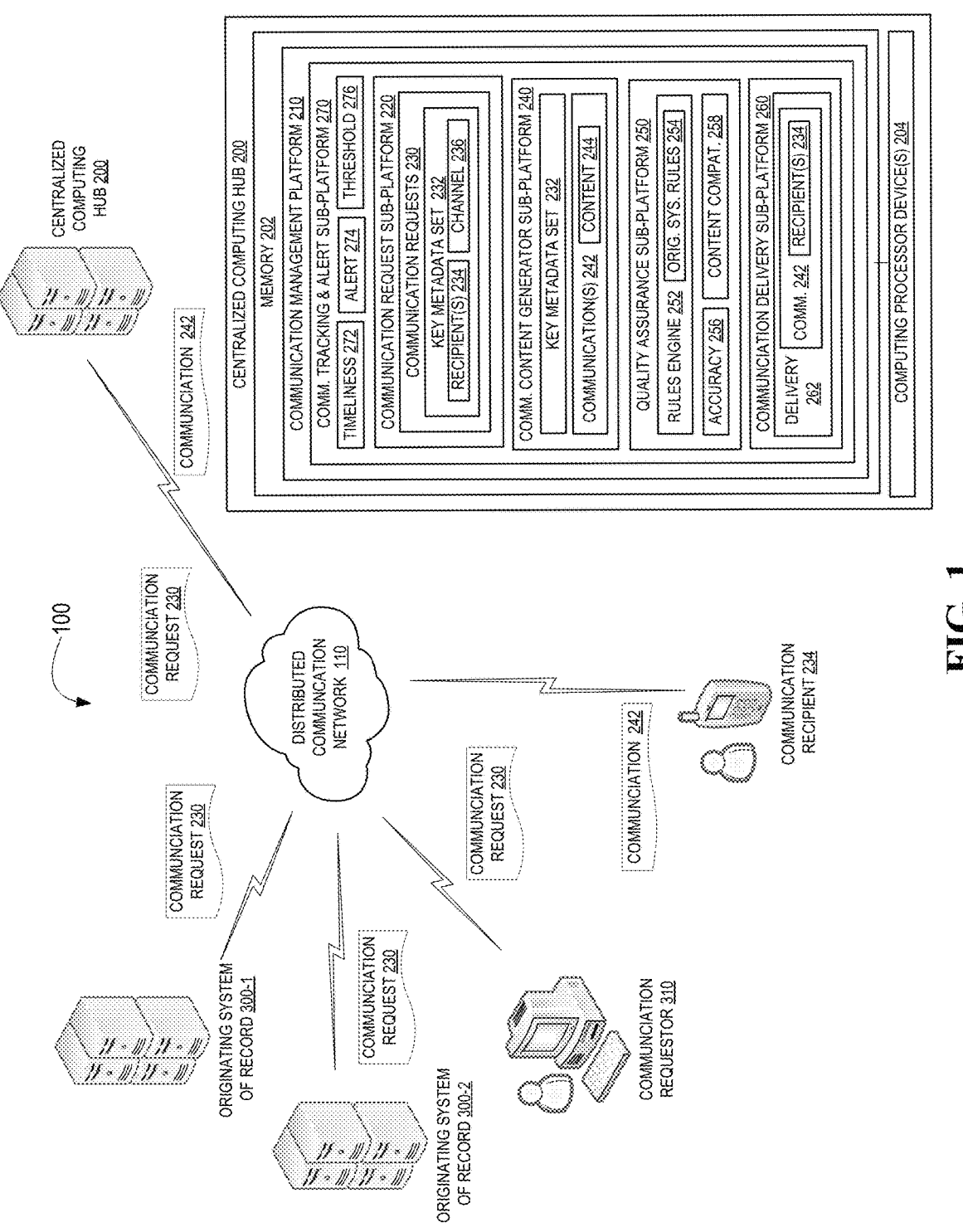
Figure 2:
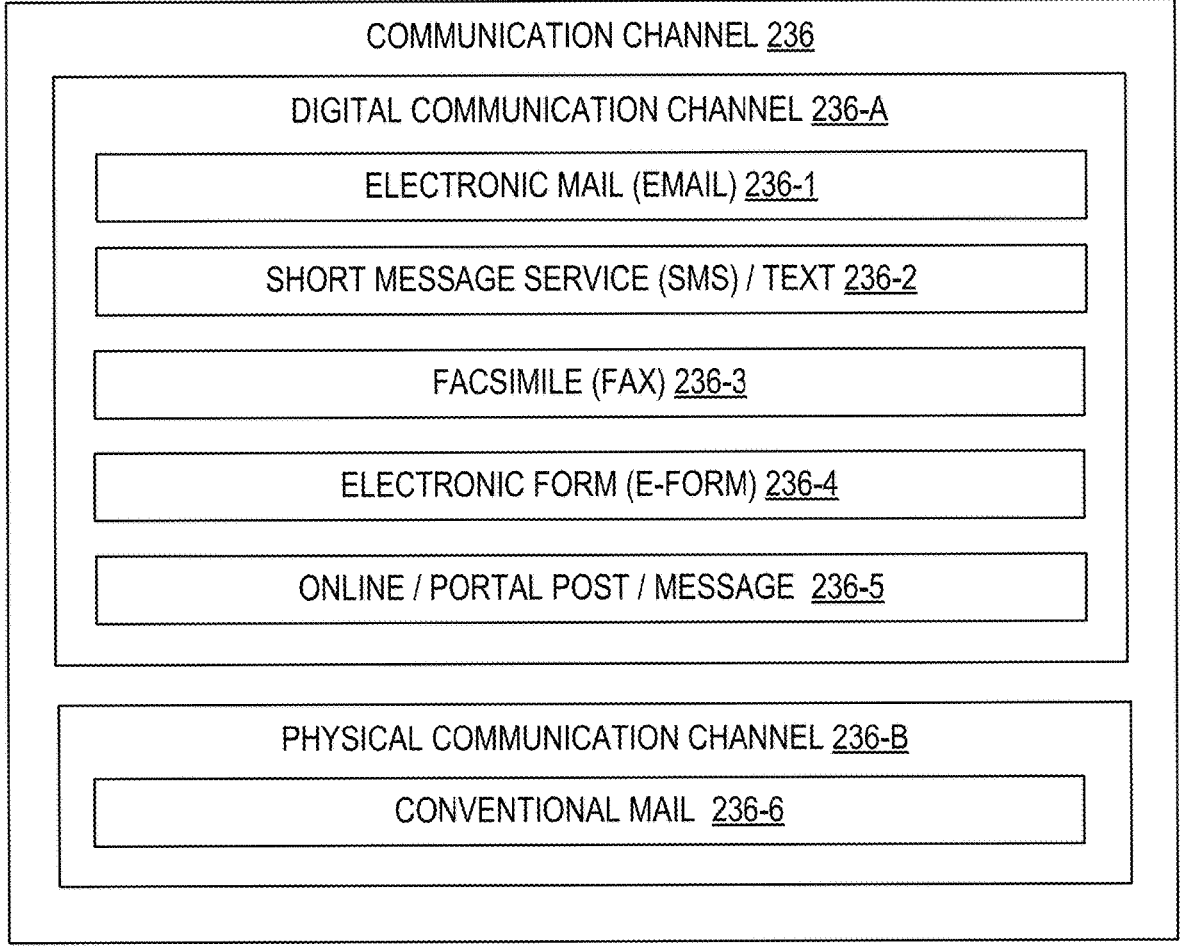
Figure 4:
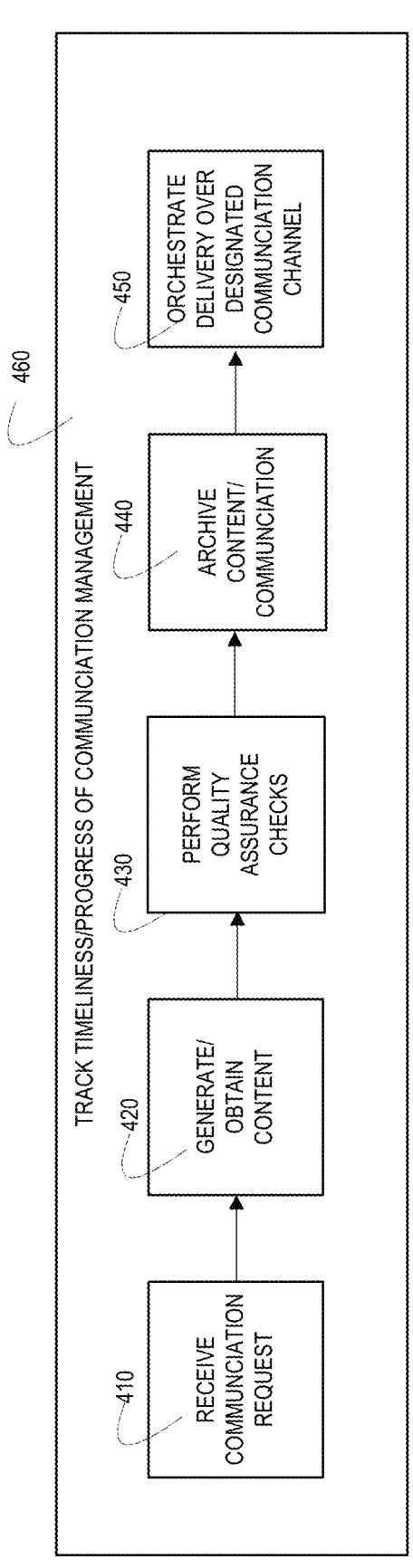
Figure 5:
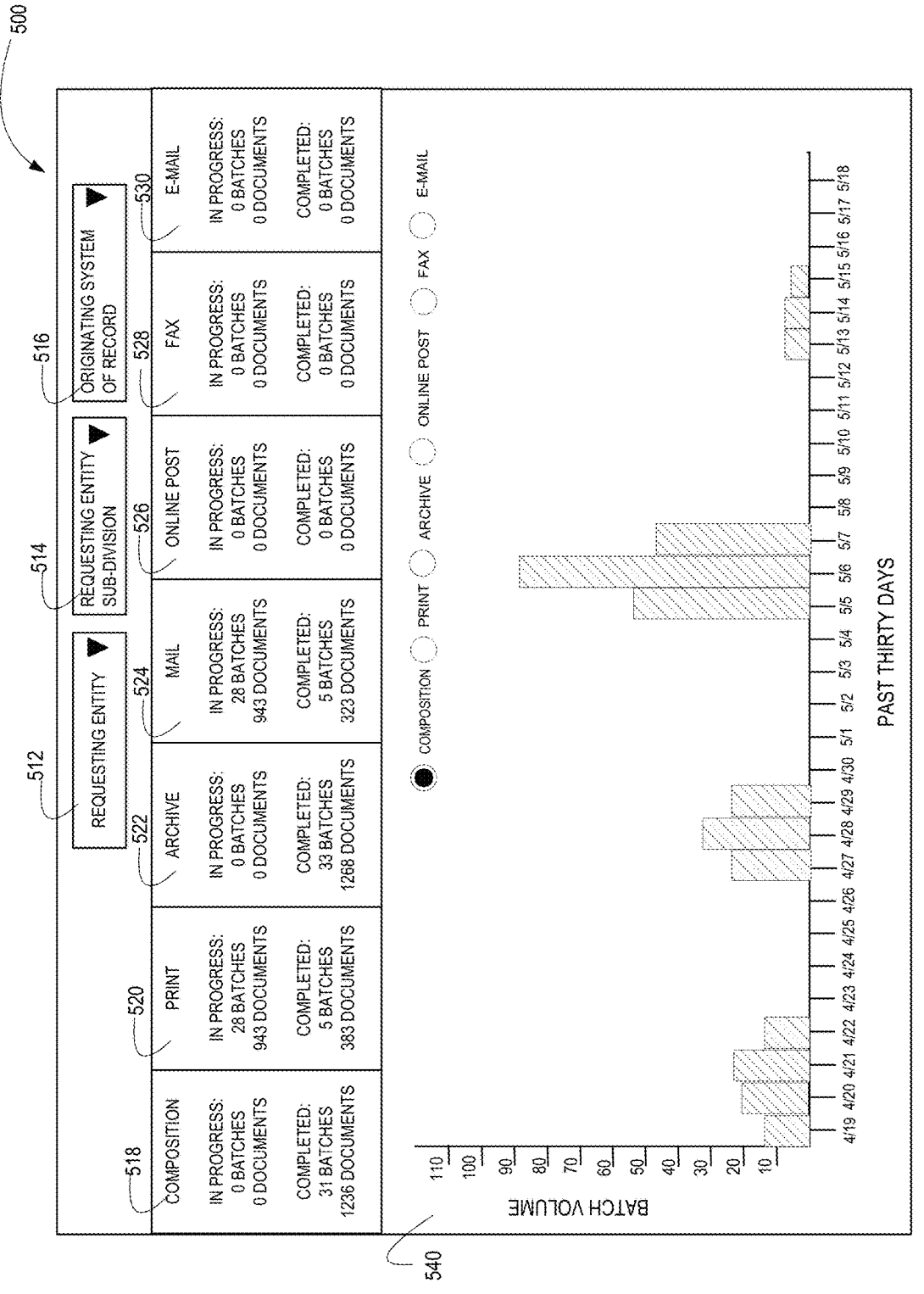

Having thus described embodiments of the disclosure in general terms, reference will now be made to the accompanying drawings, wherein:

FIG. 1 is a schematic/block diagram of a system for comprehensive and intelligent communication management including tracking of communications, in accordance with embodiments of the present invention;

FIG. 2 is a block diagram of exemplary communication channels capable of management by the intelligent communication management system, in accordance with embodiments of the present invention;

FIG. 3 is a block diagram of a centralized computing hub including a communication management platform, in accordance with alternate embodiments of the present invention;

FIG. 4 is a block/flow diagram of processing occurring within the intelligent communication management/tracking system, in accordance with embodiments of the invention;

FIG. 5 is an example of a user interface displayed within a user portal of the intelligent communication management/tracking system, in accordance with embodiments of the invention; and FIG. 6 is a flow diagram of a method for intelligent management/tracking of communications, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, a.), or an embodiment combining software and hardware aspects that may be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for a comprehensive (i.e., enterprise/entity-wide) and centralized system for managing and tracking communications being delivered through both digital communications channels and physical communication channels.

As a result of the invention, completeness, accuracy and timeliness of all communications is assured. In regard to completeness, the present invention provides assurance that all communications are complete in terms of content and have undergone requisite workflow processing, which can be demonstrated through documentation. In regard to accuracy, the present invention enforces quality assurance checks throughout the process to assure that the content is accurate and appropriate for the intended recipient. In regards to timeliness, the present invention tracks overall workflow timing as well as individual tracking of various stages of the workflow to assure that the required timing for delivery is met or, in the event that tracking of timing indicates a delay, provides mechanisms for addressing the delay to assure that the required timing for delivery is met and/or taking actions to assure future deliveries do not incur such delay(s).

Specifically, the centralized computing hub receives communication requests from originating systems of record or via user input. The requests include key metadata sets required for generating and delivering communications including communication channel (e.g., email, SMS/text, online post, snail mail, or the like), delivery recipient(s) and the like. In response to receiving a communication request, content is generated or otherwise obtained and quality assurance checks are performed to assure that the content meets the requirements of the originating system of record and is applicable to the intended communication recipient. Once the quality checks have been performed and the content is deemed verified, delivery of the communications is orchestrated in accordance with the chosen communication channel.

In addition, as the communication management workflow progresses the communications are tracked to assure the timeliness of the communications. In this regard, the present invention provides for tracking the timeliness of the overall workflow (i.e., from communication request receipt to communication delivery, as well as tracking the timeliness of individual segments/processes within the overall workflow, such as, content generation, quality assurance, communication delivery, communication receipt and the like. The tracked times are compared to timeliness thresholds to assure that the communications are or will be delivered on time. In the event that that the tracked time exceeds a timeliness threshold, an alert is automatically generated and communicated to a party of interest that is equipped to address the delay.

In specific embodiments of the invention the timeliness thresholds are dynamically determined on a continuous basis using intelligent algorithms that rely on a rolling average as to the quantity of specific communications processed during a specified period of time (e.g., daily, weekly, monthly or the like) as well the average time required to process the rolling average of communications. In this regard, the invention provides for intelligently and constantly recalibrating/updating the timeliness thresholds based on constant changes in the rolling average of communications.

Referring to FIG. 1, a schematic/block diagram is presented of an exemplary system 100 for communication management including tracking, in accordance with embodiments of the present invention. The system 100 is implemented across a distributed communication network 110, such as the Intranet, one or more intranets or the like.

System 100 includes a centralized computing hub 200, which may comprise one or more servers or the like. Centralized computing hub 200 includes memory 202 and one or more computing processor devices 204 in communication with memory 202. Memory 202 stores communication management platform 210 that is configured to manage and track both digital and physical data communications being communicated from an entity to different recipients.

Communication management platform 210 includes communication request sub-platform 220 that is configured to receive communication requests 230 from originating systems of record 300-1, 300-2 and communication requestor(s) 310. In this regard, originating systems of record 300-1, 300-2 may implement an Application Programming Interface (API) (not shown in FIG. 1), such that such certain actions taken by the originating systems of record 300-1, 300-2 which trigger data communications may prompt a call-out to the API in the form of a communication request 230. Alternatively, communication requestor 310 may have access to the communication management platform 210 via an application (not shown in FIG. 1) or the like for the purpose of inputting communication requests 230. Communication requests 230 include a key metadata set 232 which comprises data required to initiate the communication management process. Key metadata set 232 includes, but is not limited to, communication IDs (e.g., addresses or the like) for one or more communication recipients 234 and a designated communication channel over which the communication(s) are to be communicated.

Communication management platform 210 includes a communication content generator sub-platform 240 configured to generate content 244 for the communication 242 based at least on the key metadata set 232 in the communication request 230. The term "generate" as used herein includes creating new content and/or obtaining previously used content from storage. The term "content" as used herein refers to text, images or the like that are included within the body of the communication 242.

Communication management platform 210 also includes quality assurance sub-platform 250 that implements a rules engine 252. Quality assurance sub-platform 250 configured to implement originating system of record-specific rules 254 from the rules engine 252 to verify (i) accuracy/correctness 256 of the content and (ii) content compatibility 258 to each communication recipient 234 (e.g., verifying that the communication recipient is authorized to receive the specified content). In this regard, the quality checks that are undertaken to specific to both the originating system of record 300 and the individual communication recipient(s) 234.

Further, communication management platform 210 includes a communication delivery sub-platform 250 configured to, in response to validating the quality of the content 244/communication 242, orchestrate delivery 262 of the one or more communications 242 to the one or more communication recipients 234 across the designated communication channel 236.

Communication management platform 210 additionally includes a communication tracking and alert sub-platform 270 configured to track timeliness 272 of processing the one or more communications 242 within the communication management platform 210 and trigger generation and communication of one or more alerts 274 to one or more designated entities in response to the tracked timeliness 272 failing to meet one or more defined timeliness thresholds 276.

Referring to FIG. 2, a block diagram is depicted of exemplary communication channels 236 capable of being managed within the communication management platform 210, in accordance with embodiments of the present invention. As previously discussed, the communication management platform is capable of managing and tracking communications that are being delivered over both digital communication channels 236-A and physical communication channels 236-B. Digital communication channels 236-A may include, but are not limited to, electronic mail (i.e., e-mail) 236-1, Short Message Service (SMSs)/text messages 236-2, facsimile (i.e., fax) 236-3, electronic form (i.e., e-form), online/portal enablement/posting of messages 236-5 and the like. Physical communication channels may include, but are not limited to, conventional mail 236-6, which includes postal service as well as overnight/expedited delivery services.

Referring to FIG. 3, a block diagram is depicted highlighting various alternate embodiments of the communication management platform 210, in accordance with embodiments of the present invention. As previously discussed in relation to FIG. 1, centralized computing hub 200 may comprise one or multiple computing devices, such as servers, storage devices or the like. As further previously discussed, centralized computing hub 200 includes memory 202, which may comprise volatile and/or non-volatile memory, such as read-only memory (ROM) and/or random-access memory (RAM), EPROM, EEPROM, flash cards, or any memory common to computing platforms. Moreover, memory 202 may comprise cloud storage, such as provided by a cloud storage service and/or a cloud connection service.

Further, centralized computing hub 200 includes one or more computing processor devices 204, which may be an application-specific integrated circuit ("ASIC"), or other chipset, logic circuit, or other data processing device. Computing processor device(s) 204 may execute one or more application programming interface (APIs) 306 that interface with any resident programs, such as communication management platform 210 or the like, stored in memory 302 of centralized computing hub 200 and any external programs (such as originating systems of record 300 shown in FIG. 1). Centralized computing hub 200 may include various processing sub-systems (not shown in FIG. 3) embodied in hardware, firmware, software, and combinations thereof, that enable the functionality of centralized computing hub 200 and the operability of centralized computing hub 200 on a distributed communication network 110 (shown in FIG. 1), such as the Internet, intranet(s), cellular network(s) and the like. For example, processing sub-systems allow for initiating and maintaining communications and exchanging data with other networked devices. For the disclosed aspects, processing sub-systems of centralized computing hub 200 may include any sub-system used in conjunction with communication management platform 210 and related tools, routines, sub-routines, applications, sub-applications, sub-modules thereof.

In specific embodiments of the present invention, centralized computing hub 200 additionally includes a communications module (not shown in FIG. 3) embodied in hardware, firmware, software, and combinations thereof, that enables electronic communications between components of centralized computing hub 200 and other networks and network devices, such as devices executing origination systems of records 300 and those communicating with communication requestor 310. Thus, communication module may include the requisite hardware, firmware, software and/or combinations thereof for establishing and maintaining a network communication connection with one or more devices and/or networks.

As previously discussed in relation to FIG. 1, communication management platform 210 includes communication request sub-platform 220 that is configured to receive communication requests 230 from originating systems of record 300-1, 300-2 and communication requestor(s) 310. In this regard, originating systems of record 300-1, 300-2 (shown in FIG. 1) may implement an Application Programming Interface (API) (not shown in FIG. 3), such that such certain actions taken by the originating systems of record 300-1, 300-2 which trigger data communications may prompt a call-out to the API in the form of a communication request 230. Alternatively, communication requestor 310 (shown in FIG. 1) may have access to the communication management platform 210 via an application (not shown in FIG. 3) or the like for the purpose of inputting communication requests 230. Communication requests 230 include a key metadata set 232 which comprises data required to initiate the communication management process. Key metadata set 232 includes, but is not limited to, communication IDs (e.g., addresses or the like) for one or more communication recipients 234 and a designated communication channel over which the communication(s) are to be communicated.

Communication management platform 210 includes a communication content generator sub-platform 240 configured to generate or otherwise obtain content 244 for the communication 242 based at least on the key metadata set 232 in the communication request 230. Communication management platform 210 also includes quality assurance sub-platform 250 that implements a rules engine 252. Quality assurance sub-platform 250 configured to implement originating system of record-specific rules 254 from the rules engine 252 to verify (i) accuracy/correctness 256 of the content and (ii) content compatibility 258 to each communication recipient 234 (e.g., verifying that the communication recipient is authorized to receive the specified content). In this regard, the quality checks that are undertaken to specific to both the originating system of record 300 and the individual communication recipient(s) 234.

In alternate embodiments of the invention, communications management platform 210 includes communication archive sub-platform 290 configured to archive and store a digital file 294 that includes the communication 242 and/or the content 244 of the communication 242. In specific embodiments of the invention, communication archive sub-platform 290 includes a rules engine (not shown in FIG. 3) configured to be implemented to control the archiving of the communications (i.e., purge communications from the archive upon expiration of a designated archive period as defined by the rules).

Further, communication management platform 210 includes a communication delivery sub-platform 250 configured to, in response to validating the quality of the content 244/communication 242, orchestrate delivery 262 of the one or more communications 242 to the one or more communication recipients 234 across the designated communication channel 236.

Communication management platform 210 additionally includes a communication tracking and alert sub-platform

270 configured to track timeliness 272 of processing the one or more communications 242 within the communication management platform 210 and trigger generation and communication of one or more alerts 274 to one or more designated entities in response to the tracked timeliness 272 failing to meet one or more defined timeliness thresholds 276. Tracking of timeliness 272 may include tracking the overall 278 timeliness (i.e., from receipt of the communication request 230 to delivery 262 (or receipt) of the communication 242); tracking timeliness within one or more sub-platforms 220, 240, 250, 260, 290 or the like (e.g., tracking the timeliness of the content generation sub-process, the quality assurance process, the archiving process, the communication delivery process or the like); and tracking the timeliness of actual receipt of the communication 242 by the communication recipient 234.

In specific embodiments of the invention, communication tracking and alert sub-platform 270 implements at least one intelligent algorithm 280 that is configured to intelligently and dynamically determine, on a continuous basis, the one or more timeliness thresholds 276 based at least on historical communication patterns 282 that define an average volume of communications requested from (i) an originating system of record 300 from amongst the plurality of originating systems of record or (ii) from communication requestors 310 over a predefined rolling historical time period. In this regard, the timeliness thresholds are constantly evolving over time as the average number of communications processed varies over the rolling historical time period (e.g., previous week, month, year or the like). In specific embodiments of the invention, the at least one intelligent algorithm is further configured to intelligently and dynamically determine, on a continuous basis, the one or more timeliness thresholds, wherein the timeliness thresholds are based on a predicted average volume of communications requested from (i) the originating system from amongst the plurality of originating systems of record 300 or (ii) from communication requestors 310 over a predefined future time period. In this regard, the timeliness threshold reflects what the platform is expected/predicted to process in a future time period (e.g., next week, month, year or the like).

Further, communication tracking and alert sub-platform 270 is configured to generate and initiate communication of alerts to predesignated parties of interest in response to the tracked timeliness 272 meeting or otherwise exceeding a timeliness threshold 276. Thus, timeliness alerts may be sent out if a sub-platform-related timeliness threshold is not met (e.g., failure to complete content generation or quality assurance checks within an allotted period of time) or if the overall communication management timeliness threshold is not met (e.g., failure to complete the process (from communication request receipt to communication delivery) within an allotted time period.

Referring to FIG. 4, a block/flow diagram is depicted of a method 400 for managing data communication, in accordance with embodiments of the present invention. At Event 410, communication requests are received from origination-systems of record and/or communication requestors. The communication requests include a key metadata set that comprises, but is not limited to, communication recipient identifiers (e.g., physical or digital addresses, account identifiers or the like) and designated communication channel (e.g., email, SMS/text, physical mail, online enablement/post, fax or the like).

At Event 420, the content for the communication is generated or otherwise obtained. In specific instances new content is generated while other previously used content may be obtained from storage or the like. In response to generating/obtaining the communication content, at Event 430, quality assurance checks are performed using originating system of record-specific or communication-requestor-specific rules that define the quality assurance criteria and parameters. In specific embodiments of the invention, the quality assurance checks are configured to verify the accuracy of the content and the compatibility of the content to the communication recipient (i.e., verify that the communication recipient is authorized to receive the content).

In response to successfully performing the quality assurance checks, at Event 440 the content and/or communication are archived/stored. In specific embodiments of the invention, archiving includes monitoring for expiration of a predetermined archive period, such that, the communication is purged/deleted from the archive upon expiration of the predetermined archive period. At Event 450, delivery of the communication over the designated communication channel is orchestrated including verification that the communication has been received and/or opened/read by the communication recipient.

At Event 460, the timeliness/progress of the communication management process is tracked. Tracking of timeliness may include tracking the overall timeliness of the communication management process, tracking the timeliness at individual sub-process (e.g., at Events 410-450) and/or tracking the timeliness of actual receipt of the communication by the communication recipient. Timeliness is compared to timeliness threshold to determine if the overall process or one of the sub-process has occurred or is occurring within prescribed time limits (i.e., timeliness threshold). In the event that timeliness is determined to meet or exceed the timeliness threshold, alerts are generated and communicated to one or more parties of interests that are trained to address the timeliness concern.

Referring to FIG. 5, an exemplary User Interface (UI) 500 is depicted, in accordance with embodiments of the present invention. The UI is part of a user portal incorporated within the communication management platform 210 (shown in FIGS. 1 and 3) of the present invention. The top portion of the UI 500 includes pull-down windows for the user to select the requesting entity 512 (e.g., line of business), a requesting sub-division 514 (e.g., line of business sub-division) and the originating system of record 516 (e.g., application or the like). In response to user selection of 512, 514 and 516, the UI will display the information as shown. Specifically, the UI will depict for the selected requesting entity 512 and originating SOR 516 (and where applicable requesting entity sub-division) thirty day "in progress" and "completed" totals for both (i) batches and (ii) overall documents (i.e., communications) in the categories of composition/generation 518, print (as it pertains to standard mail) 520, archive 522, standard mail 524, online post/enablement 526, fax 528 and email 530. In addition, UI 500 depicts a graphical representation 540 that shows the document/communication volume completed in the past thirty day time period for the selected category of "composition". As previously discussed, the rolling thirty day average will be used to dynamically determine the timeliness thresholds used as a trigger for generating alerts based on tracked timeliness.

Referring to FIG. 6, a flow diagram is depicted of a method 600 for communication management, in accordance with embodiments of the present invention. At Event 610 a communication request is received for an origination system of record that requests one or more communications. The communication request includes a key metadata set that defines criteria for communicating the communication(s) in the communication requests. The key metadata set includes, but is not limited to, communication recipient identifiers and a designated communication channel for delivering the communication(s).

At Event 620, content is generated or otherwise obtained for the communications based at least on the key metadata set and the communications are compiled. In response, at Event 630 quality assurance checks are executed by implementing origination system-specific rules to verify the accuracy of the content and recipient-compatibility of the content. Once the quality assurance checks have been completed, at Event 640, delivery of the communications to the communication recipients is orchestrated across the designated communication channel.

At Event 650, timeliness of the processing of communications is tracked from (i) communication request receipt to (ii) communication delivery and generation/communication of alerts are triggered based on the tracked timeliness exceeding a timeliness threshold. The tracked timeliness may be the time required to complete the overall communication management, the time required a sub-process of the communication management (one of Events 610-640), the time for actual receipt of the communication by the communication recipient or the like. In specific embodiments of the invention, intelligent algorithms are implemented to dynamically and continuously determine the timeliness thresholds based on changes to rolling averages of the volume of communications managed/processed within a designated time period. In specific embodiments of the invention, the intelligent algorithms determine the timeliness thresholds based on the predicted future average volumes of communications over a predetermined future time period.

Thus, as described in detail above, present embodiments of the invention include systems, methods, computer program products and/or the like that provide for a comprehensive and centralized system for managing and tracking communications being delivered through both digital communications channels and physical communication channels. The timeliness of the communications is tracked throughout the system and alerts are generated in response to the timeliness exceeding thresholds. Thresholds are intelligently determined on a continuous basis using rolling averages of previous communications and may be based on intelligent predictions of future communication averages.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for centralized and intelligent communication management, is executable by one or more computing processor devices, the method comprising:

receiving communication requests from a plurality of origination systems, wherein each communication request includes a key metadata set defining criteria for communicating one or more communications, wherein the criteria includes (i) one or more communication recipients for receiving a corresponding communication from amongst the one or more communications and (ii) a designated communication channel for delivering the one or more communications;

generating content for the one or more communications in a corresponding communication request based on the key metadata set;

implementing origination system-specific rules to verify (i) accuracy and (ii) communication recipient-compatibility of the content;

orchestrating delivery of the one or more communications to the one or more communication recipients across the designated communication channel; and tracking timeliness of processing the one or more communications from receiving the communications to orchestrating delivery of the one or more communications and triggering generation and communication of one or more alerts to one or more designated entities in response to the tracked timeliness failing to meet one or more defined timeliness thresholds.

2. The computer-implemented method of claim 1, wherein tracking timeliness and triggering the generation and communication of one or more alerts further comprises at least one of:

tracking an overall timeliness of an entirety of processing the one or more communications from receiving the communications to orchestrating delivery of the one or more communications and triggering the generation and communication of alerts to designated entities in response to the tracked overall timeliness failing to meet a defined overall timeliness threshold; and tracking timeliness within one or more of the steps of (i) generating content, (ii) orchestrating delivery and triggering generation and communication of alerts to designated entities in response to the tracked timeliness within one or more of the steps of (i) generating content, (ii) orchestrating delivery failing to meet one or more defined step-specific timeliness thresholds.

3. The computer-implemented method of claim 1, further comprising:

dynamically determining, on a continuous basis, the one or more timeliness thresholds based at least on historical communication patterns that define an average volume of communications requested from (i) an originating system from amongst the plurality of originating systems or (ii) an entity in control of the originating system over a predefined rolling historical time period.

4. The computer-implemented method of claim 1, wherein tracking the timeliness further comprises tracking timeliness of receipt of the one or more communications by the corresponding one or more communication recipients and triggering generation and communication of one or more alerts to one or more designated entities in response to the tracked timeliness of receipt of the one or more communications by the corresponding one or more communication recipients failing to meet one or more defined receipt-related timeliness thresholds.

5. The computer-implemented method of claim 1, further comprising:

identifying quality deficiencies in one or more of the steps of (i) generating content, (ii) orchestrating delivery and, in response to identifying a quality deficiency, implementing one or more corrective actions to remedy the quality deficiency.

6. A system for centralized and intelligent communication management, the system comprising:

a centralized computing hub including a memory, and one or more computing processor devices in communication with the memory, wherein the memory stores a communication management platform, executable by at least one of the one or more computing processor devices, capable of managing communications delivered across both digital communications channels and physical communication channels and including:

a communication request sub-platform configured to receive communication requests from a plurality of origination systems, wherein each communication request includes a key metadata set defining criteria for communicating one or more communications, wherein the criteria includes (i) one or more communication recipients for receiving a corresponding communication from amongst the one or more communications and (ii) a designated communication channel for delivering the one or more communications;

a communication generator sub-platform configured to generate content for the one or more communications in a corresponding communication request based on the key metadata set;

a quality assurance sub-platform including a rules engine, wherein the quality assurance sub-platform is configured to implement origination system-specific rules from the rules engine to verify (i) accuracy and (ii) communication recipient-compatibility of the content;

a communication delivery sub-platform configured to orchestrate delivery of the one or more communications to the one or more communication recipients across the designated communication channel; and a communication tracking and alert sub-platform configured to track timeliness of processing the one or more communications within the communication management platform and trigger generation and communication of one or more alerts to one or more designated entities in response to the tracked timeliness failing to meet one or more defined timeliness thresholds.

7. The system of claim 6, wherein the communication tracking and alert sub-platform is configured to track an overall timeliness of an entirety of processing the one or more communications within the communication management platform and trigger generation and communication of alerts to designated entities in response to the tracked overall timeliness failing to meet a defined overall timeliness threshold.

8. The system of claim 6, wherein the communication tracking and alert sub-platform is configured to track timeliness within one or more sub-platforms of the communication management platform and trigger generation and communication of alerts to designated entities in response to the tracked timeliness within one of the one or more sub-platforms failing to meet one or more defined sub-platform-specific timeliness thresholds.

9. The system of claim 6, wherein the communication tracking and alert sub-platform includes at least one intelligent algorithm configured to intelligently and dynamically determine, on a continuous basis, the one or more timeliness thresholds based at least on historical communication patterns that define an average volume of communications requested from (i) an originating system from amongst the plurality of originating systems or (ii) an entity in control of the originating system over a predefined rolling historical time period.

10. The system of claim 9, wherein the at least one intelligent algorithm configured to intelligently and dynamically determine, on a continuous basis, the one or more timeliness thresholds, wherein the timeliness thresholds are based on a predicted average volume of communications requested from (i) the originating system from amongst the plurality of originating systems or (ii) the entity in control of the originating system over a predefined future time period.

11. The system of claim 6, wherein the communication tracking and alert sub-platform is further configured to track timeliness of receipt of the one or more communications by the corresponding one or more communication recipients and trigger generation and communication of one or more alerts to one or more designated entities in response to the tracked timeliness of receipt of the one or more communications by the corresponding one or more communication recipients failing to meet one or more defined receipt-related timeliness thresholds.

12. The system of claim 6, wherein the communication request sub-platform is further configured to generate a batch identifier for the one or more communications in a corresponding request and wherein the communication tracking and alert sub-platform is further configured to capture data within one or more of the sub-platforms based on the batch identifier and track the timeliness of processing the one or more communications within the communication management platform based on the captured data.

13. The system of claim 6, wherein the communication management platform is capable of managing communications delivered across both the digital communications channels and the physical communication channels, wherein the digital communication channels include electronic mail (email), facsimile, Short Message Service (SMS)/text messages, online portal posts and electronic forms (e-forms) and the physical communication channels include physical mail.

14. The system of claim 6, wherein the quality assurance sub-platform includes at least one intelligent algorithm configured to intelligently identify quality deficiencies in the processing the one or more communications within the communication management platform and, in response to identifying a quality deficiency, implement one or more corrective actions to remedy the quality deficiency.

15. The system of claim 6, wherein the at least one intelligent algorithm is further configured to intelligently identify quality deficiencies, wherein the quality deficiencies include an error in delivering a communication to a communication recipient and in response to identifying the error, implement the one or more corrective actions, wherein the corrective actions include at least one of (i) calling back the delivery of the communication to the communication recipient and notifying an entity in control of the originating system of the error in delivery.

16. A computer program product including a non-transitory computer-readable medium, the non-transitory computer-readable medium comprising sets of codes for causing one or more computing devices to receive communication requests from a plurality of origination systems, wherein each communication request includes a key metadata set defining criteria for communicating one or more communications, wherein the criteria includes (i) one or more communication recipients for receiving a corresponding communication from amongst the one or more communications and (ii) a designated communication channel for delivering the one or more communications;

generate content for the one or more communications in a corresponding communication request based on the key metadata set;

implement origination system-specific rules to verify (i) accuracy and (ii) communication recipient-compatibility of the content;

orchestrate delivery of the one or more communications to the one or more communication recipients across the designated communication channel; and track timeliness of processing the one or more communications from receiving the communications to orchestrating delivery of the one or more communications and trigger generation and communication of one or more alerts to one or more designated entities in response to the tracked timeliness failing to meet one or more defined timeliness thresholds.

17. The computer program product of claim 16, wherein the set of codes for causing the one or more computer devices to track timeliness and trigger the generation and communication of one or more alerts are further configured to cause the one or more computing devices to perform at least one of:

track an overall timeliness of an entirety of processing the one or more communications from receiving the communications to orchestrating delivery of the one or more communications and trigger the generation and communication of alerts to designated entities in response to the tracked overall timeliness failing to meet a defined overall timeliness threshold; and track timeliness of at least one of (i) generating content, and (ii) orchestrating delivery and triggering generation and communication of alerts to designated entities in response to the tracked timeliness within at least one of (i) generating content, (ii) orchestrating delivery failing to meet one or more defined step-specific timeliness thresholds.

18. The computer program product of claim 16, wherein the sets of codes further comprise a set of codes for causing the one or more computer devices to:

dynamically determine, on a continuous basis, the one or more timeliness thresholds based at least on historical communication patterns that define an average volume of communications requested from (i) an originating system from amongst the plurality of originating systems or (ii) an entity in control of the originating system over a predefined rolling historical time period.

19. The computer program product of claim 16, wherein the set of codes for causing the one or more computer devices to track timeliness and trigger the generation and communication of one or more alerts are further configured to cause the one or more computing devices to:

track timeliness of receipt of the one or more communications by the corresponding one or more communication recipients and trigger generation and communication of one or more alerts to one or more designated entities in response to the tracked timeliness of receipt of the one or more communications by the corresponding one or more communication recipients failing to meet one or more defined receipt-related timeliness thresholds.

20. The computer program product of claim 16, wherein the sets of codes further comprise a set of codes for causing the one or more computer devices to:

identify quality deficiencies in one or more of the steps of (i) generating content, (ii) orchestrating delivery and, in response to identifying a quality deficiency, implementing one or more corrective actions to remedy the quality deficiency.

\* \* \* \* \*